United States Patent

Westbrook, Jr.

[11] 3,892,321
[45] July 1, 1975

[54] MOTORCYCLE CARRIER FOR WRECKERS

[76] Inventor: Edward L. Westbrook, Jr., 6049 W. 14th Ln., Hialeah, Fla. 33012

[22] Filed: Nov. 1, 1974

[21] Appl. No.: 520,109

[52] U.S. Cl. .......................... 214/86 A; 254/139.1
[51] Int. Cl.² .......................................... B60P 3/12
[58] Field of Search ............ 214/86 A; 224/42.03 B; 280/402; 254/139.1

[56] References Cited
UNITED STATES PATENTS

| | | | |
|---|---|---|---|
| 2,491,357 | 12/1949 | Ashton | 214/86 A |
| 2,497,379 | 2/1950 | Vandergrift, Sr. et al. | 214/86 A |

*Primary Examiner*—Albert J. Makay
*Attorney, Agent, or Firm*—Salvatore G. Militana

[57] ABSTRACT

This invention is concerned with providing a carrier that is adapted to be mounted on the rear of a wrecker for supporting and carrying a motorcycle by the wrecker. Briefly the apparatus consists of a tow bar secured at one end to the wrecker and having a cross member at the free end with open hooks on each end of the cross member about which straps are received that extend about the front and rear end portions of a motorcycle to support same. A closed hook is mounted on the center of the cross member and is engaged by the winch hook for lifting the carrier and the motorcycle off the ground. Further straps extend to the rear of the wrecker from the front and rear wheels of the motorcycle prevent the swinging of the motorcycle as the wrecker carries off the motorcycle.

4 Claims, 5 Drawing Figures

PATENTED JUL 1 1975 3,892,321

SHEET 1

MOTORCYCLE CARRIER FOR WRECKERS

BACKGROUND OF THE INVENTION

1. Field of the Invention

This invention relates generally to towing devices for use on automobile wreckers and is more particularly directed to a device for carrying a motorcycle by a wrecker.

2. Description of the Prior Art

At the present time, there is no device or apparatus on the market for the purpose of carrying a motorcycle by an automobile wrecker by use of its winch as is done in the towing of an automobile. If a motorcycle is to be carried by a wrecker, the operator merely places the motorcycle on the wrecker. This is objectionable for the reasons that the operator has to first improvise some sort of a sling for lifting the motorcycle onto the body of the wrecker where there usually is not sufficient space for receiving the motorcycle confortably. Therefore, the motorcycles are apt to become damaged or at least the paint is scratched by the handling of the motorcycle thus. It is contemplated by the applicant's device to avoid the objections stated above.

SUMMARY OF THE INVENTION

Therefore, a principal object of the present invention is to provide a motorcycle carrier for wreckers which carriers can be readily mounted on the conventional wreckers without having to make any design changes of the wrecker and which is removable so as to not interfere with the normal function of towing automobiles.

Another object of the present invention is to provide a motorcycle carrier for wreckers that is simple in construction, inexpensive in cost and is most effective for carrying motorcycles without resulting in any damage to the motorcycle.

A still further object of the present invention is to provide a motorcycle carrier for wreckers, which carrier consists of a minimum of parts that are readily stored on the wrecker when the carrier is not in use.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

DESCRIPTION OF THE PREFERRED EMBODIMENT

Figure 1:
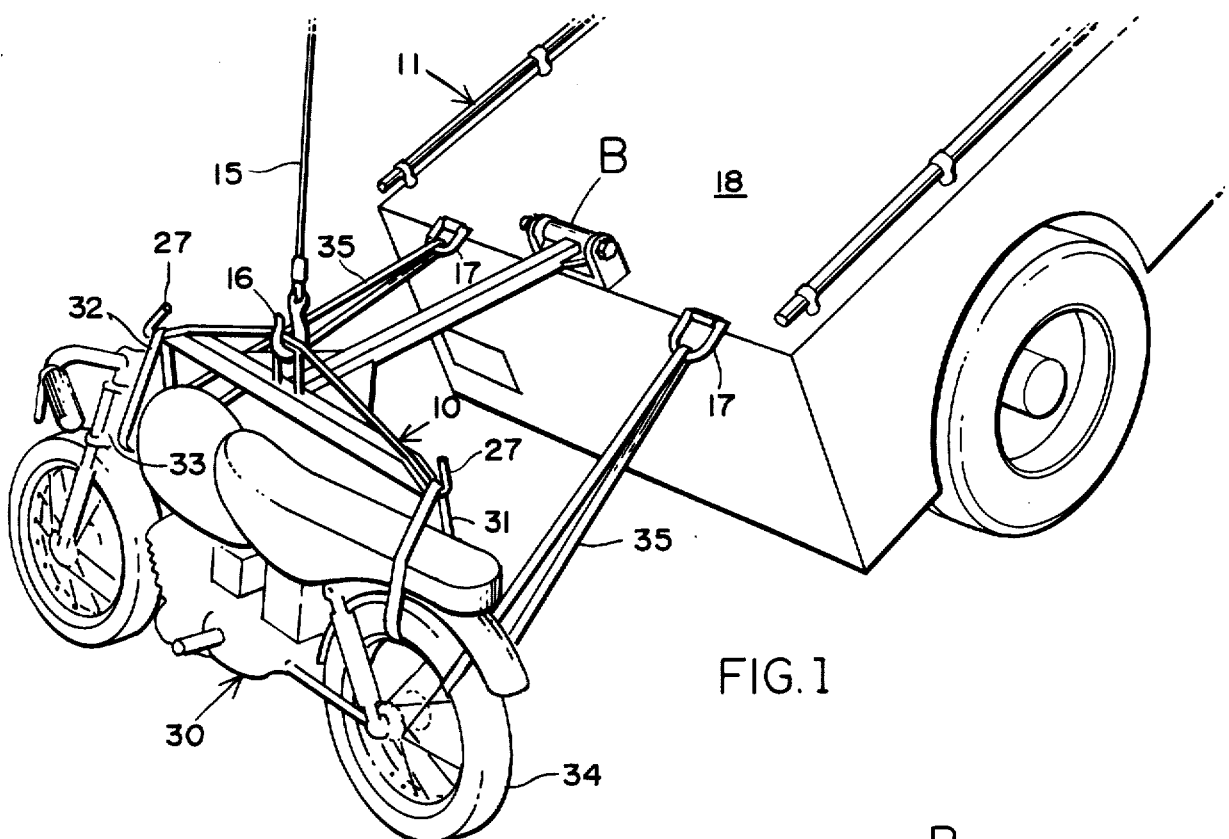
FIG. 1 is a perspective view of an automobile wrecker shown only in part with my motorcycle carrier mounted thereon and a motorcycle being carried thereby.

Referring to the drawings wherein like numerals are used to designate similar parts throughout the several views, the numeral 10 refers to my motorcycle carrier being carried in position on the auto wrecker 11 by a winch 12. The winch 12 is conventional consisting of a cross arm 13, winch cables 14 for adjusting the angle at which the cross arm 13 is positioned and tow line 15 which extends to my carrier 10 and is connected thereto by a tow hook 16 secured to the line 15.

Figures 3, 4:
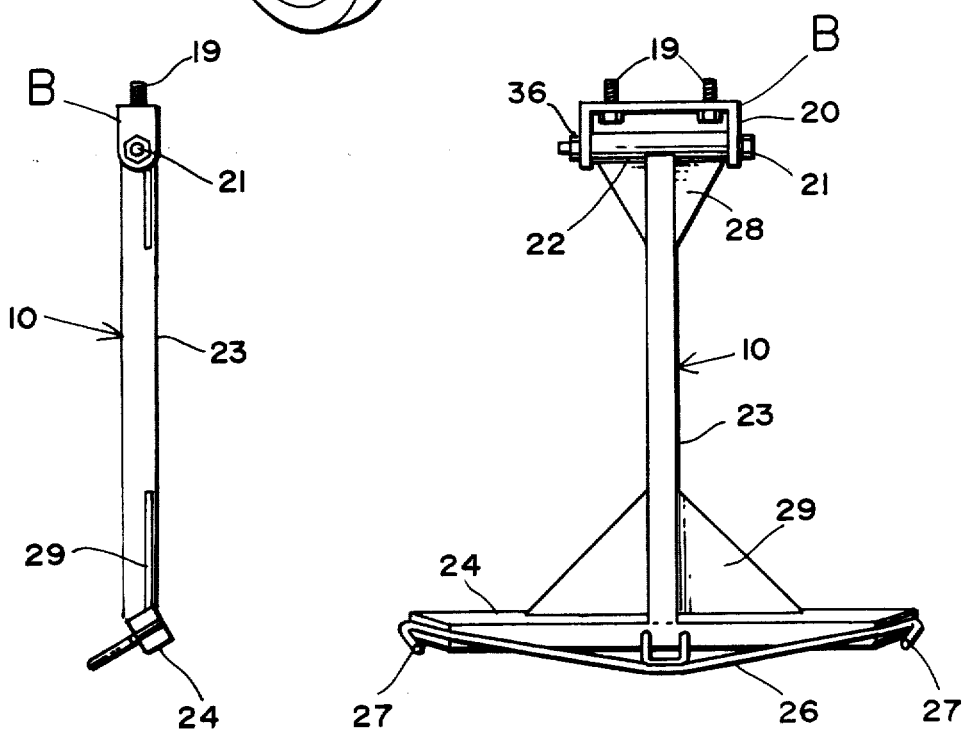
FIG. 3 is a top plan view of my motorcycle carrier as seen removed from the wrecker.
FIGS. 4 and 5 are side and end views, respectively.

My motorcycle carrier device 10 consists of a U-shaped bracket -B- mounted on the rear edge portion of the body 18 of the wrecker 11. The bracket -B- is bolted as by bolts 19 to the body 18 having upstanding leg portions 20 between which my device supporting bolt-like rod 21 extends. Rotatably mounted on the rod 21 is a tubular support member 22 welded or otherwise secured to the end of an elongated tow bar 23. At the other end of the tow bar 23 there is a rectangular shaped cross member 24 which is welded to the tow bar 23 at approximately a 35° angle out of alignment with the longitudinal axis or centerline of the tow bar 23 as best shown by FIG. 4. At the mid-portion of the cross member 24, there extends upwardly a U-shaped hook 25 with a rod-like brace 26 extending along the full length of the cross member 24. The cross brace 26 which is formed into hooks 27 at each end thereof is welded to the ends of the cross member 24 and extend over the hook 25 to which the cross brace 26 is likewise welded. Diagonal extending brace plates 28 and 29 are welded at the position of the ends of the tow bar 23 at the tubular support 22 and cross member 24 for strengthening the device.

To adapt a conventional automobile wrecker 11 for carrying motorcycles with my carrier 10 all that need be done is mount the bracket -B- in position on the body 18. When making the wrecker 10 ready to carry a motorcycle 30 the tubular support 22 is placed between the legs 20 of the bracket -B- and the bolt 21 inserted through openings in the bracket legs 20 and the tubular support 22 with the nut 27 threaded on the bolt 21 to secure same.

Figure 2:
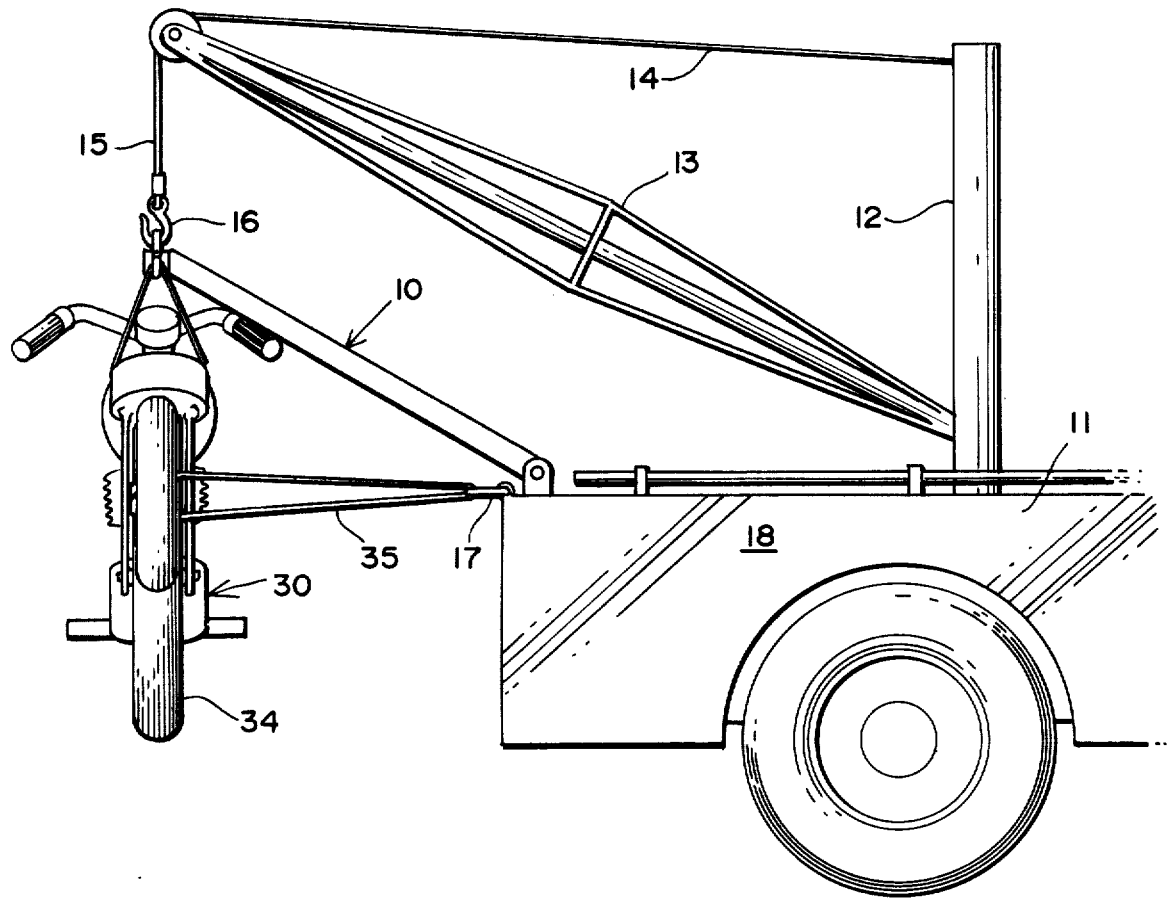
FIG. 2 is a side elevational view thereof.
Figure 5:
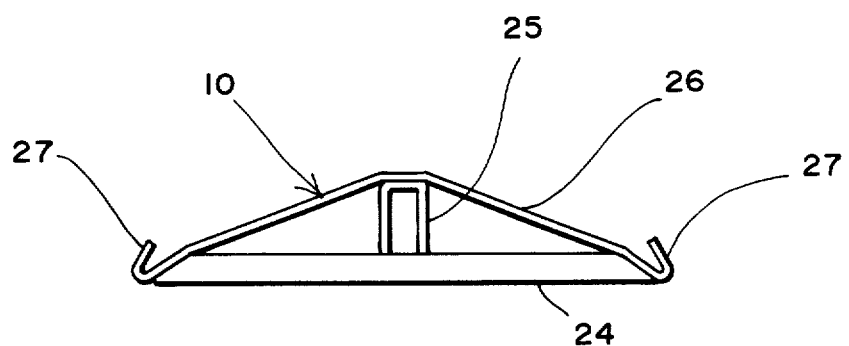

The cross member 24 is then swung downwardly until it is positioned in alignment with and directly above but not engaging the motorcycle 30. The front end of the motorcycle 30 is bound to the device 10 by a strap 32 that engages the hook 27 and extends about the steering joint 33 of the motorcycle 30. At the rear end of the motorcycle 30, strap 31 extends about the other hook 27 and through the rear wheel 34. With the straps 31 and 32 properly tightened, the motorcycle 30 will hang spaced from the cross bar 24 in a vertical position. Now the winch 12 is actuated to lift the cross member 24 and the attached motorcycle 30 off the ground on which the latter had been resting until the hook 25 will assume a vertical position as shown by FIG. 2 and the tow bar 23 will extend upwardly at approximately 35° above the horizontal. Staps 35 which extend through the hooks 17 will be wound through the rear and front wheels of the motorcycle 30 and then tightened until the motorcycle 30 is made to tilt toward the wrecker a very slight amount. The motorcycle 30 is now ready to be carried by the wrecker 11 and the motorcycle 30 being so maintained thereon that it cannot swing or sway or be in any way damaged during the transportation of the motorcycle 30 by my device 10.

What I claim as new and desire to secure by Letters Patent of the United States is:

1. A motorcycle carrier for wreckers comprising an elongated tow bar, a bracket adapted to be mounted on the rear portion of the wrecker, connecting means mounted at one end of said tow bar rotatably secured to said bracket, a cross member mounted at the other end of said tow bar, closed hook means mounted on said cross member in substantially vertical alignment with said tow bar and extending upwardly at an obtuse angle thereto for receiving a winch hook for lifting said motorcycle above the ground, open hook means mounted at each end of said cross member, strap means extending about each of said hook means and adapted to engage said motorcycle for supporting said motorcycle and further means extending from substantially the front and rear portions of said motorcycle to said wrecker whereby said motorcycle will be prevented from swinging as the motorcycle is being carried by said wrecker.

2. The structure as recited by claim 1 wherein said open hook means comprise a rod extending over said closed hook means and along the full length of said cross member terminating in end portions bent upon themselves to form upwardly extending open hooks.

3. The structure as recited by claim 2 wherein said further means comprise straps extending through a closed hook mounted on said wrecker on each side of said bracket.

4. The structure as recited by claim 3 wherein said bracket comprises a U-shaped member having upstanding leg portions and a rod extending between said leg portions, and said connecting means comprising a tubular member extending between said leg portions and rotatably mounted on said rod thereby permitting the vertical movement of said carrier.

* * * * *